K. BISCHOFF.
HORSESHOE.
APPLICATION FILED APR. 13, 1914.
1,144,344.
Patented June 29, 1915.
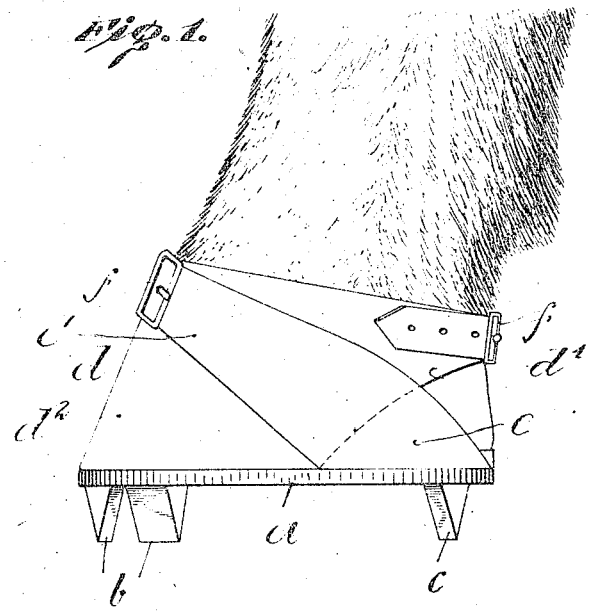
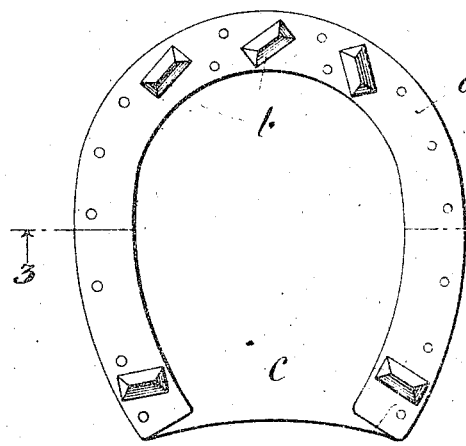
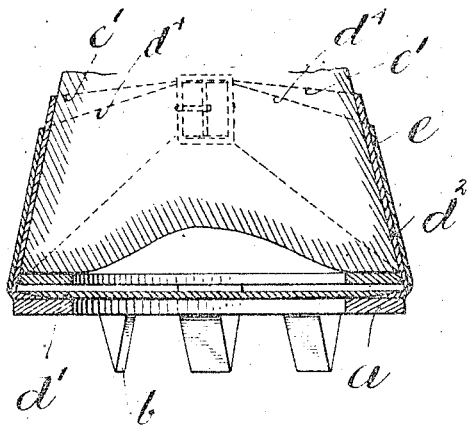
Witnesses:
C. S. Ashley
D. Klein
Inventor
Karl Bischoff
By his Attorney
Max t. Ordmann

UNITED STATES PATENT OFFICE.

KARL BISCHOFF, OF NEW YORK, N. Y.

HORSESHOE.

1,144,344.             Specification of Letters Patent.     Patented June 29, 1915.

Application filed April 13, 1914. Serial No. 831,359.

*To all whom it may concern:*

Be it known that I, KARL BISCHOFF, a subject of the German Emperor, residing at New York, in the county of New York and State of New York, have invented certain new and useful Improvements in Horseshoes, of which the following is a specification.

The object of this invention is to provide an anti-slipping horeshoe which could be readily applied to the hoof of the horse whenever required.

To accomplish this end, my invention consists in a horseshoe which is attached to a case or sheath made of leather or other suitable material and adapted to be fastened around the horse's hoof. The sharp-edged toe and heel calks are removably fixed in the shoe and are arranged at different angles so as to prevent slipping.

The new horseshoe may be applied to the hoof over the ordinary shoe fixed to the hoof, to be used temporarily for preventing slipping. But the same may also be used permanently in lieu of the ordinary shoe.

My invention also consists in other novel features that will be hereinafter fully specified and set forth in the annexed claim.

In the accompanying drawing, which forms part of this specification and in which similar reference characters denote corresponding parts, Figure 1 is an elevation of my new horseshoe shown as applied to a horse's hoof; Fig. 2 is a bottom plan view thereof and Fig. 3 a section on line 3—3 of Fig. 2.

Referring specifically to the drawing $a$ denotes the shoe proper, which is of ordinary shape and may be made of any suitable metal. The toe and heel calks $b$, $c$ are wedge-shaped and removably fixed in the shoe. They are so disposed as to have their sharp edges extend in different directions, whereby slipping will be prevented.

The shoe is not, as ordinarily, designed to be nailed or otherwise directly fixed to the hoof, but to be removably applied to the latter. To this end I provide a case or sheath $d$ of leather or other suitable material, which comprises a base $d'$ shaped to conform with the bottom contour of the hoof, an upwardly sloping sleeve-shaped piece $d^2$, designed to fit around the front and sides of the hoof and side flaps $e$. The shoe proper $a$ is fixed to the base $d'$ by rivets $d^3$ or the like. The piece $d^2$ and base may be made of a single piece of material or, as in the present example, of separate pieces, joined together by the rivets $d^3$ or the like. The piece $d^2$ is formed at both sides with straps or extensions $d^4$ to be tied around the narrowest part of the rear of the hoof. The side flaps $e$ are also fixed to the base $d'$ and formed with upward and forward strap like extensions $e'$ adapted to be tied around the narrowest front part of the hoof. By reason of the hoof widening toward the bottom, the straps $d^4$ and $e'$, when properly tied, will prevent the sheath from slipping off the hoof. To fasten the end of the straps, buckles $f$ or other suitable means may be used.

As various changes may be made in the construction without departing from the principle of my invention I do not wish to limit myself to the details shown and described.

What I claim and desire to secure by Letters Patent is:

The combination with a horseshoe, of a sheath comprising a base shaped to conform with the bottom contour of the hoof, an upwardly sloping sleeve-shaped piece adapted to fit around the front and sides of the hoof and formed with extensions to be fastened at the rear of the hoof and side flaps fixed on the rear of the base and adapted to be fastened in front of the hoof.

In testimony whereof I affix my signature in presence of two witnesses.

KARL BISCHOFF.

Witnesses:
  E. D. JUNIOR,
  D. KLEIN.